US 9,127,578 B2

(12) United States Patent
Pursifull et al.

(10) Patent No.: US 9,127,578 B2
(45) Date of Patent: *Sep. 8, 2015

(54) CRANKCASE INTEGRITY BREACH DETECTION

(75) Inventors: Ross Dykstra Pursifull, Dearborn, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/618,884

(22) Filed: Sep. 14, 2012

(65) Prior Publication Data

US 2014/0081548 A1     Mar. 20, 2014

(51) Int. Cl.
| | |
|---|---|
| *B60T 7/12* | (2006.01) |
| *F01M 13/00* | (2006.01) |
| *F01M 11/10* | (2006.01) |
| *F02D 41/22* | (2006.01) |
| *F02M 35/10* | (2006.01) |
| *F02M 25/06* | (2006.01) |
| *G01M 15/04* | (2006.01) |

(52) U.S. Cl.
CPC ............... *F01M 13/00* (2013.01); *F01M 11/10* (2013.01); *F02D 41/22* (2013.01); *F02M 25/06* (2013.01); *F02M 35/1038* (2013.01); *F02M 35/10222* (2013.01); *G01M 15/042* (2013.01); *F01M 2013/0083* (2013.01); *F02D 2250/08* (2013.01); *Y02T 10/40* (2013.01)

(58) Field of Classification Search
CPC ... F02D 41/222; F01M 13/00; F02M 13/0011

USPC ............... 701/101, 107, 113, 114; 123/41.86, 123/572, 574; 73/114.32, 114.33
See application file for complete search history.

(56) References Cited

U.S. PATENT DOCUMENTS

| | | | |
|---|---|---|---|
| 5,585,552 | A | 12/1996 | Heuston et al. |
| 5,792,949 | A | 8/1998 | Hewelt et al. |
| 5,897,597 | A | 4/1999 | O'Daniel |
| 6,240,772 | B1 | 6/2001 | Thomas |
| 6,247,464 | B1 | 6/2001 | Maegawa et al. |
| 6,779,388 | B2 | 8/2004 | Baeuerle et al. |
| 7,080,547 | B2 | 7/2006 | Beyer et al. |
| 7,275,527 | B2 | 10/2007 | Bruchner et al. |

(Continued)

OTHER PUBLICATIONS

Pursifull, Ross Dykstra, "Method for Determining Crankcase Breach and Oil Level," U.S. Appl. No. 13/451,314, filed Apr. 19, 2012, 25 pages.
Beshay, Mansour et al., "Aspirator for Crankcase Ventilation and Vacuum Generation," U.S. Appl. No. 13/549,226, filed Jul. 13, 2012, 43 pages.

(Continued)

*Primary Examiner* — John Kwon
(74) *Attorney, Agent, or Firm* — Jim Voutyras; Alleman Hall McCoy Russell & Tuttle LLP

(57) ABSTRACT

Systems and methods for monitoring crankcase ventilation system integrity are disclosed. In one example approach, a method comprises indicating a crankcase ventilation system degradation based on a lower vacuum than expected downstream of a PCV breather tube. For example, indicating a crankcase ventilation system degradation based on a lower vacuum than expected downstream of a PCV breather tube may include indicating a crankcase ventilation system degradation based on an absolute pressure sensor measurement relative to a gauge pressure sensor measurement.

20 Claims, 3 Drawing Sheets

(56) References Cited

U.S. PATENT DOCUMENTS

| | | |
|---|---|---|
| 2009/0211545 A1 | 8/2009 | Satou |
| 2010/0031936 A1 | 2/2010 | Ofner |
| 2010/0095746 A1 | 4/2010 | Lund |
| 2010/0147270 A1 | 6/2010 | Pursifull et al. |
| 2011/0023852 A1 | 2/2011 | Yamashita |
| 2011/0030658 A1 | 2/2011 | Ulrey et al. |
| 2012/0285421 A1* | 11/2012 | Cunningham et al. ........ 123/436 |
| 2014/0069534 A1* | 3/2014 | Cunningham et al. ........ 137/557 |
| 2014/0076249 A1* | 3/2014 | Rollinger et al. .......... 123/41.86 |
| 2014/0081549 A1* | 3/2014 | Rollinger et al. ............. 701/101 |
| 2014/0081551 A1* | 3/2014 | Rollinger et al. ............. 701/101 |
| 2014/0081564 A1* | 3/2014 | Pursifull et al. .............. 701/113 |

OTHER PUBLICATIONS

Rollinger, John Eric et al., "Crankcase Integrity Breach Detection," U.S. Appl. No. 13/619,676, filed Sep. 14, 2012, 60 pages.

Jentz, Robert Roy et al., "Crankcase Integrity Breach Detection," U.S. Appl. No. 13/619,751, filed Sep. 14, 2012, 63 pages.

Rollinger, John Eric et al., "Crankcase Integrity Breach Detection," U.S. Appl. No. 13/619,856, filed Sep. 14, 2012, 62 pages.

Rollinger, John Eric et al., "Crankcase Integrity Breach Detection," U.S. Appl. No. 13/619,941, filed Sep. 14, 2012, 61 pages.

Pursifull, Ross Dykstra et al., "Crankcase Integrity Breach Detection," U.S. Appl. No. 13/620,021, filed Sep. 14, 2012, 61 pages.

* cited by examiner

CRANKCASE INTEGRITY BREACH DETECTION

BACKGROUND/SUMMARY

Engines may include crankcase ventilation systems to vent gases out of the crankcase and into an engine intake manifold to provide continual evacuation of gases from inside the crankcase in order to reduce degradation of various engine components in the crankcase.

Under certain conditions, crankcase ventilation systems may be monitored to identify breaches in the system. For example, a fresh air hose (breather tube) may become disconnected, an oil cap may be off or loose, a dipstick may be out, and/or other seals in the crankcase ventilation system are broken then degradation of various components included in the crankcase may occur.

Diagnostic blowby approaches may be used to monitor crankcase ventilation system integrity. For example, a pressure sensor may be used in the crankcase and a valve in a PCV fresh air hose may be opened so that pressure or vacuum changes may be sensed in the crankcase to determine if there is a breach in the system.

In other approaches, a plurality of absolute sensors, e.g., a barometric pressure sensor (BP), a compressor inlet pressure sensor (CIP), a throttle inlet pressure sensor (TIP), a manifold air pressure sensor (MAP), and/or a pressure sensor in a crankcase vent hose, etc., may be used in combination to monitor crankcase ventilation system integrity.

However, the inventors herein have recognized that such approaches may add additional hardware to such monitoring systems, e.g., additional sensors and valves, thus increasing costs and complexity of a crankcase ventilation monitoring system. For example, a compressor inlet and a crankcase vent tube may read substantially the same pressure under certain conditions; thus, including sensors in both the PCV breather tube and at the compressor inlet may not be needed when used in combination with a barometric pressure sensor during crankcase ventilation system diagnostic routines.

Thus, in one approach, to at least partially address these issues, a method for monitoring crankcase ventilation system integrity is provided. The method comprises indicating a crankcase ventilation system degradation based on a lower vacuum than expected downstream in a crankcase vent tube or in the main engine air duct to with the crankcase vent tube attaches. For example, indicating a crankcase ventilation system degradation based on a lower vacuum than expected downstream of a crankcase vent tube may include indicating a crankcase ventilation system degradation based on an absolute pressure sensor measurement relative to a gauge pressure sensor measurement.

In this way, the number of sensors and valves employed in a crankcase ventilation monitoring system may potentially be reduced, leading to a reduction in cost and complexity in a crankcase ventilation monitoring system. Further, in such an approach, the crankcase ventilation system may remain active during a diagnostic procedure.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
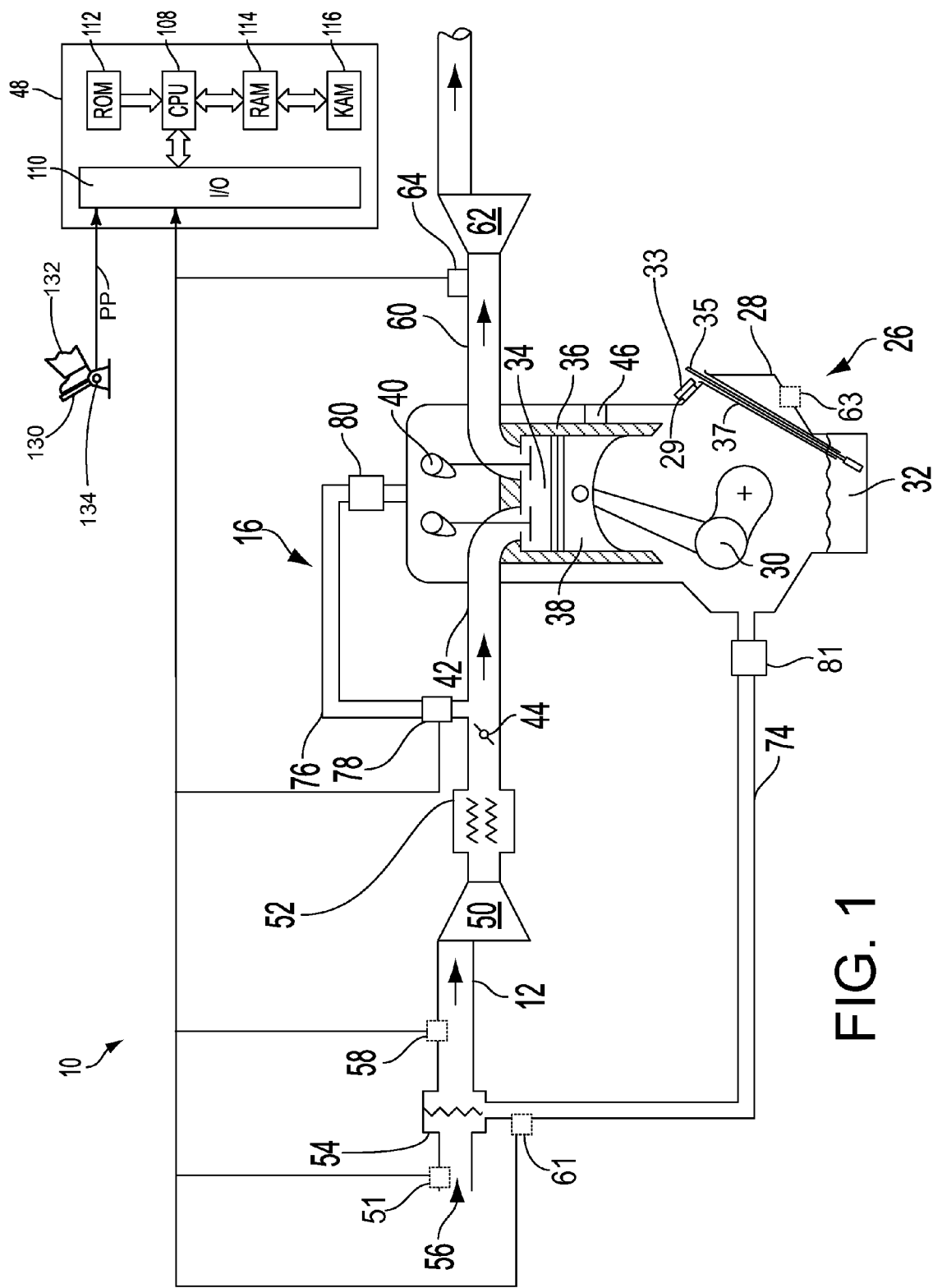
FIG. 1 shows a partial engine view in accordance with the disclosure.
Figure 2:
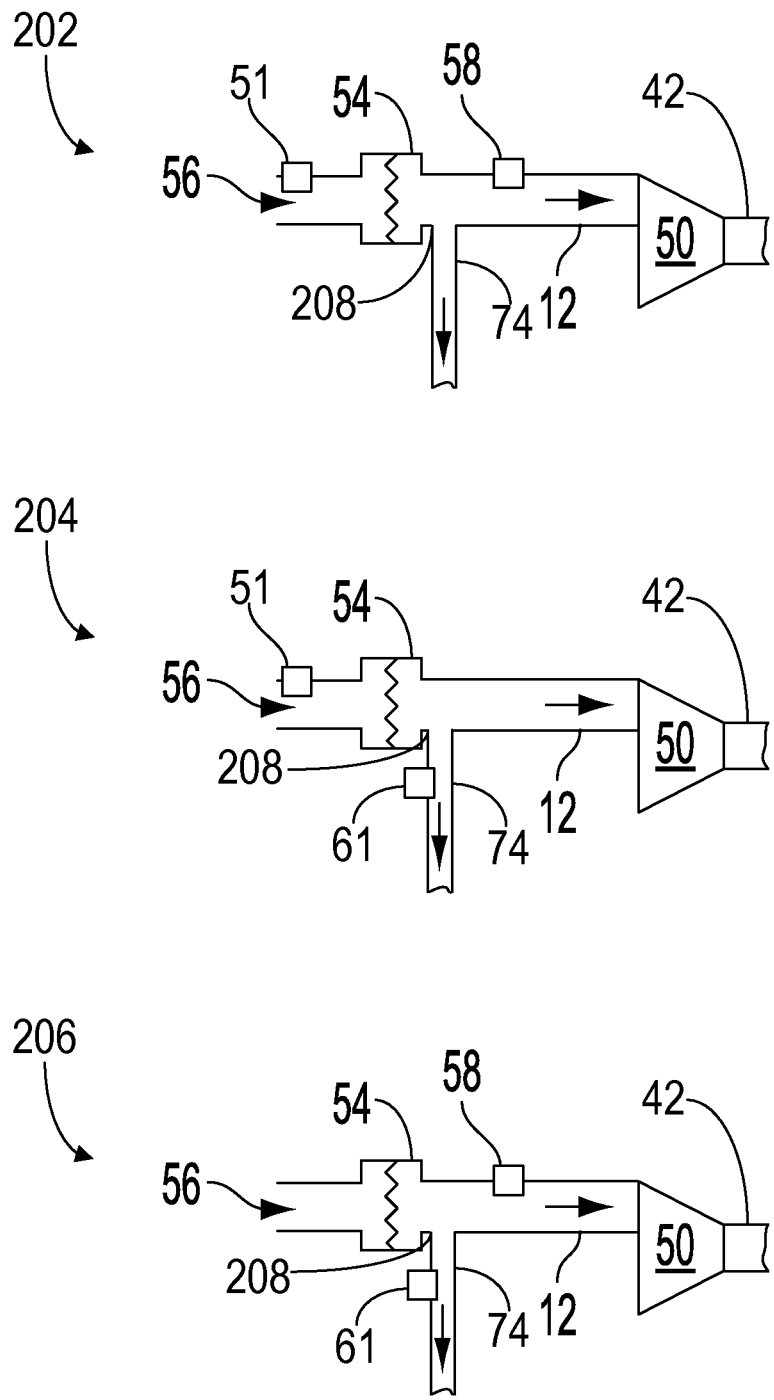
FIG. 2 shows example embodiments of crankcase ventilation system monitoring sensors in accordance with the disclosure.
Figure 3:
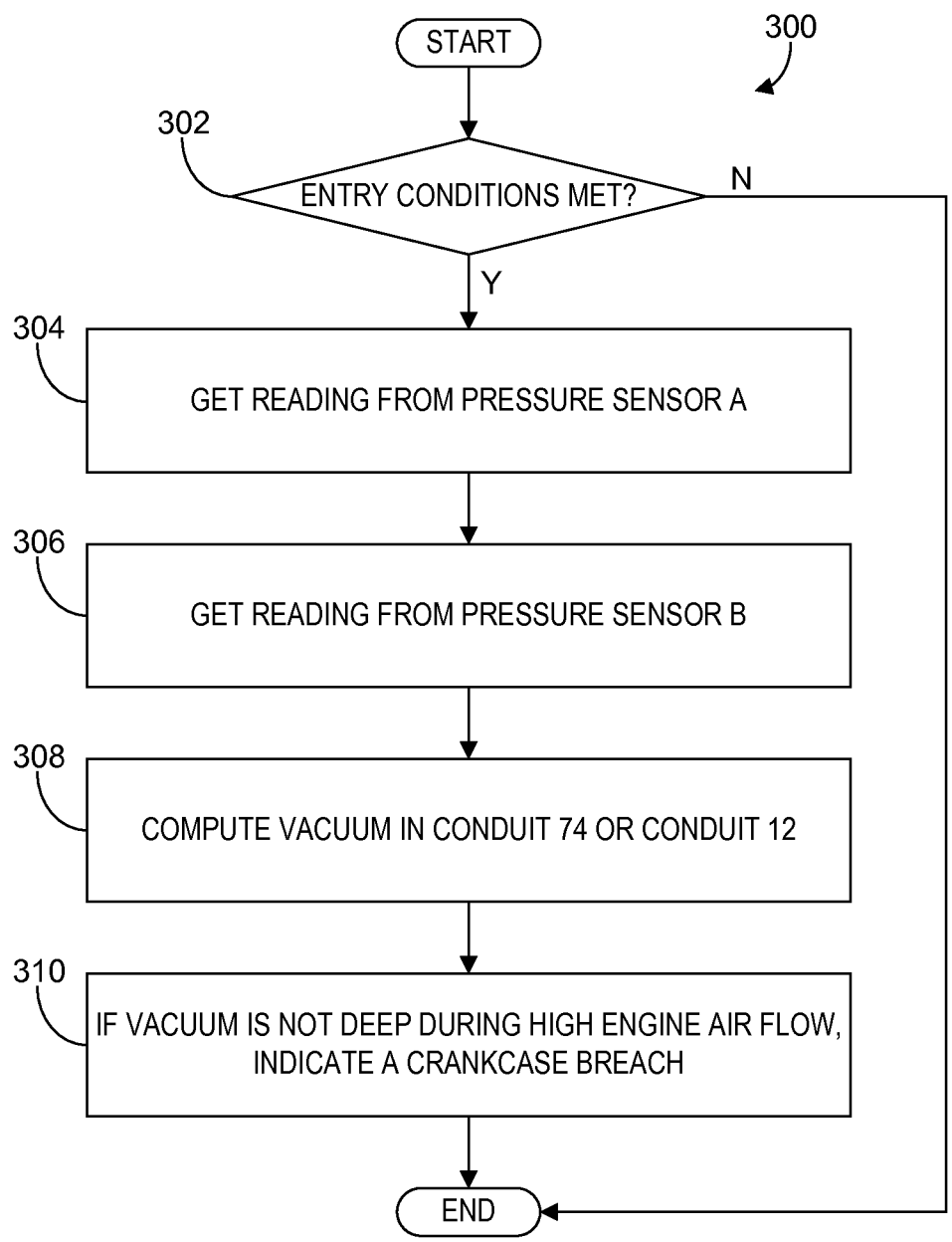
FIG. 3 shows an example method for an engine in accordance with the disclosure.

The following description relates to systems and methods for monitoring crankcase ventilation system integrity in a crankcase ventilation system in an engine, such as in the engine shown in FIG. 1. Various sensor configurations, such as shown in FIG. 2, may be used to monitor a crankcase ventilation system to detect breaches in the system while using a reduced number of sensors. For example, as shown in FIG. 3, a comparison of two sensor readings may be used to detect crankcase ventilation system breaches, such as a PCV fresh air hose disconnect.

Referring now to FIG. 1, it shows an example system configuration of a multi-cylinder engine, generally depicted at 10, which may be included in a propulsion system of an automobile. Engine 10 may be controlled at least partially by a control system including controller 48 and by input from a vehicle operator 132 via an input device 130. In this example, input device 130 includes an accelerator pedal and a pedal position sensor 134 for generating a proportional pedal position signal PP.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. Oil fill port 29 may include an oil cap 33 to seal oil port 29 when the engine is in operation. A dip stick tube 37 may also be disposed in crankcase 28 and may include a dipstick 35 for measuring a level of oil in oil well 32. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injectors 40 and intake air from intake manifold 42 which is positioned downstream of throttle 44. The engine block 26 may also include an engine coolant temperature (ECT) sensor 46 input into an engine controller 48 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream compressor 50 and may filter fresh air entering intake passage 56.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a wastegate bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 48.

In the example of FIG. 1 a positive crankcase ventilation system (PCV) 16 is coupled to the engine intake so that gasses in the crankcase may be vented in a controlled manner from the crankcase. The crankcase ventilation system 16 draws air into crankcase 28 via a breather or vent tube 74. Breather tube 74 may be coupled to fresh air intake 12 upstream of compressor 50. In some examples, breather tube may be coupled to air cleaner 54. In other examples, breather tube may be coupled to intake 12 downstream of air cleaner 54.

The crankcase ventilation system vents air out of the crankcase and into intake manifold 42 via conduit 76 which, in some examples, may include a one-way PCV valve 78 to provide continual evacuation of gases from inside the crankcase 28 before connecting to the intake manifold 42. However, in other examples conduit 76 may not include a one-way PCV valve. As shown in the example of FIG. 1, the PCV conduit 76 may include a uni-directional oil separator 80 which filters oil from vapors exiting crankcase 28 before they re-enter the intake system 12. Another oil separator 81 may be disposed in conduit 74 to filter oil from vapors exiting crankcase 28. In some examples, PCV conduit 76 may also include a vacuum sensor coupled to the PCV system. In some examples, gas flow in conduit 74 may go in both directions, from crankcase 28 towards intake 12 and/or from intake 12 towards crankcase 28. Further, in some examples, during certain engine operating conditions, e.g., in turbocharger applications, gas may flow through conduit 76 in both directions, from crankcase 28 towards intake 42 and/or from intake 42 towards crankcase 28.

While the engine is running under light load and moderate throttle opening, the intake manifold's air pressure is may be less than crankcase air pressure. The lower pressure of the intake manifold draws fresh air towards it, pulling air from the crankcase vent tube 74 through the crankcase (where it dilutes and mixes with combustion gases), through the PCV valve, and into the intake manifold.

Controller 48 is shown in FIG. 1 as a microcomputer, including microprocessor unit 108, input/output ports 110, an electronic storage medium for executable programs and calibration values shown as read only memory chip 112 in this particular example, random access memory 114, keep alive memory 116, and a data bus. Controller 48 may receive various signals from various sensors coupled to engine 10, engine coolant temperature (ECT) from temperature sensor 46; EGR pressure from vacuum sensor 72; exhaust gas air/fuel ratio from exhaust gas sensor 64; and other PCV diagnostic sensors described below. Storage medium read-only memory 112 can be programmed with computer readable data representing instructions executable by processor 108 for performing the methods described below, as well as other variants that are anticipated but not specifically listed.

As remarked above, under certain conditions, crankcase ventilation systems may be monitored via a variety of sensors to identify breaches in the crankcase ventilation system. For example, a crankcase vent tube may become disconnected, an oil cap may be off or loose, a dipstick may be out, and/or other seals in the crankcase ventilation system are broken then degradation of various components included in the crankcase may occur.

Diagnostic blow by approaches may be used to monitor crankcase ventilation system integrity. For example, a pressure sensor 63 may optionally be used in the crankcase and a valve (not shown) in the crankcase vent tube 74 may be opened so that pressure or vacuum changes may be sensed in the crankcase to determine if there is a breach in the ventilation system. However, as remarked above, in such blow by approaches, a valve in the fresh air tube 74 may be closed during a portion of the monitoring routine preventing crankcase gases from being exhausted and possibly leading to degradation of components.

In other approaches, a plurality of absolute sensors, e.g., a barometric pressure sensor (BP) 51, a compressor inlet pressure sensor (CIP) 58, and/or a pressure sensor 61 in the crankcase vent tube 74, may be used in combination to monitor crankcase ventilation system integrity. For example, in some approaches, a barometric sensor 51, a compressor inlet sensor 58, and a pressure sensor 61 in the PCV fresh air hose 74 may all be used in to monitor crankcase ventilation system integrity. However, using all these sensors to monitor crankcase ventilation system integrity may be unnecessary and may increase costs associated with the inclusion of all the sensors. For example, a compressor inlet and a crankcase vent tube may read substantially the same pressure under certain conditions; thus, including sensors in both the PCV breather tube and at the compressor inlet may not be needed when used in combination with a barometric pressure sensor during crankcase ventilation system diagnostic routines.

Thus, instead of using a combination of BP sensor 51, CIP sensor 58, and pressure sensor 61, a monitoring system may use two sensors, an absolute pressure sensor and a gauge pressure sensor in various configurations such as shown in FIG. 2 described below.

For example, FIG. 2 shows a first example embodiment 202 of a sensor configuration of a crankcase ventilation monitoring system. Embodiment 202 includes a BP sensor 51 disposed in engine intake 12 upstream of air cleaner 54 and a coupling 208 of crankcase vent tube 74 with intake 12. However, in other examples BP sensor 51 may be disposed at any suitable location to measure barometric pressure. For example BP sensor may be disposed in intake 12 at or inside of the coupling 208 of breather tube 74 with intake 12.

FIG. 2 shows the crankcase vent tube 74 coupled to the clean air side of air cleaner 54, however, in other examples, breather tube 74 may be coupled to intake 12 downstream of air cleaner 54. For example breather tube 74 may be coupled to intake 12 downstream of air cleaner 54 and upstream of compressor 50.

Embodiment 202 also includes a CIP sensor 58 disposed in intake 12 upstream of compressor 50 and downstream of the coupling 208 of fresh air tube 74 with intake 12. In some examples, CIP sensor may be disposed in an inlet of compressor 50 so that air pressure entering compressor 50 may be measured.

In embodiment 202, one of BP sensor 51 and CIP sensor 58 may be an absolute sensor configured to measure pressure relative to a perfect vacuum, and the other of BP sensor 51 and CIP sensor 58 may be a differential or gauge sensor configured to measure pressure relative to atmospheric pressure. For example, BP sensor 51 may be an absolute pressure sensor and CIP sensor 58 may be a gauge pressure sensor. As another example, BP sensor 51 may be a gauge pressure sensor and CIP sensor 58 may be an absolute pressure sensor.

As remarked above, under certain conditions, for example during high engine air flow rate conditions, a pressure reading upstream of compressor 50 and downstream of the coupling 208 of crankcase vent tube 74 with intake 12, e.g., at a compressor inlet, may be substantially the same as a pressure reading in crankcase vent tube 74. Thus, in some examples, as shown in example embodiment 204, instead of including a CIP sensor 58, a pressure sensor 61 may be disposed in crankcase vent tube 74 and used together with BP sensor 51 to monitor the crankcase ventilation system.

In embodiment 204, one of BP sensor 51 and crankcase vent tube pressure sensor 61 may be an absolute sensor configured to measure pressure relative to a perfect vacuum, and the other of BP sensor 51 and breather tube pressure sensor 61 may be a differential or gauge sensor configured to measure pressure relative to atmospheric pressure. For example, BP sensor 51 may be an absolute pressure sensor and breather tube pressure sensor 61 may be a gauge pressure sensor. As another example, BP sensor 51 may be a gauge pressure sensor and breather tube pressure sensor 61 may be an absolute pressure sensor.

As another example, under certain conditions, for example during high engine air flow rate conditions, a pressure reading in crankcase vent tube 74 may be substantially the same as a pressure reading measured by BP sensor 51. Thus, in some examples, as shown in example embodiment 206, instead of including a BP sensor 51, a pressure sensor 61 may be disposed in crankcase vent tube 74 and used together with CIP sensor 58 to monitor the crankcase ventilation system.

In embodiment 206, one of CIP sensor 58 and crankcase vent tube pressure sensor 61 may be an absolute sensor configured to measure pressure relative to a perfect vacuum, and the other of CIP sensor 58 and crankcase vent tube pressure sensor 61 may be a differential or gauge sensor configured to measure pressure relative to atmospheric pressure. For example, CIP sensor 58 may be an absolute pressure sensor and crankcase vent tube pressure sensor 61 may be a gauge pressure sensor. As another example, CIP sensor 58 may be a gauge pressure sensor and breather tube pressure sensor 61 may be an absolute pressure sensor.

FIG. 3 shows an example method 300 for monitoring a crankcase ventilation system and detecting breaches in crankcase ventilation system 16 using one of the sensor configurations shown in FIG. 2. For example, a crankcase ventilation system degradation may be indicated based on an absolute pressure sensor measurement relative to a gauge pressure sensor measurement, as described below.

At 302, method 300 includes determining if entry conditions are met. For example, entry conditions may include a high intake air flow engine operating condition such as a turbocharger spool up condition, an engine RPM greater than a threshold value, etc. For example, the monitoring routine may be initiated in response to a driver operated accelerator pedal position, for example in response to a tip-in initiated by the driver.

If entry conditions are met at 302, method 300 proceeds to 304. At 304, method 300 includes determining pressure via an absolute pressure sensor. For example, a barometric pressure (BP) may be determined based on an absolute BP sensor, such as sensor 51. In other examples, pressure may be determined by an absolute CIP sensor or an absolute pressure sensor 61 in breather tube 74 depending on the sensor configuration of the monitoring system.

At 306, method 300 includes determining pressure via a gauge pressure sensor. For example, a compressor inlet pressure (CIP) may be determined based on a gauge CIP sensor, such as sensor 58. In other examples, pressure may be determined by a gauge BP sensor or a gauge pressure sensor in breather tube 74 depending on the sensor configuration of the monitoring system.

At 308, method 300 includes comparing the absolute sensor pressure and gauge sensor pressure. For example, a barometric pressure reading from BP sensor 51 may be compared with a compressor inlet pressure sensor reading from CIP sensor 58, e.g., in embodiment 202. In other examples, a pressure reading from breather tube pressure sensor 61 may be compared with a barometric pressure sensor reading from BP sensor 51, e.g., in embodiment 204. In still other examples, a pressure reading from breather tube pressure sensor 61 may be compared with a compressor inlet pressure sensor reading from CIP sensor 58, e.g., in embodiment 206.

At 310, method 300 includes indicating crankcase ventilation system degradation based on the comparison of the absolute sensor pressure and gauge sensor pressure, e.g., based on comparison of BP pressure and CIP pressure. For example, a crankcase ventilation system degradation, such as a breach in the crankcase ventilation system, may be indicated when the absolute pressure sensor measurement is substantially equal to the gauge pressure sensor measurement. Further, in some examples, a crankcase ventilation system degradation may not be indicated if the absolute pressure sensor measurement is not substantially equal to the gauge pressure sensor measurement.

In particular, if a breach is present in the crankcase ventilation system, for example, if breather tube 74 became disconnected from intake 12, oil cap 33 is off or loose, or dipstick 35 is out, then, in one example, during high air flow engine operating conditions a pressure reading upstream of coupling 208 may be substantially equal to a pressure reading at an inlet of compressor 50. As another example, if a breach is present in the crankcase ventilation system, then a pressure reading in the breather tube 74 may be substantially equal to a barometric pressure reading, e.g., via BP sensor 51. As still another example, if a breach is present in the crankcase ventilation system, then a pressure reading in the breather tube 74 may be substantially equal to a pressure reading at an inlet of compressor 50, e.g., via CIP sensor 58.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system.

Further still, it should be understood that the systems and methods described herein are exemplary in nature, and that these specific embodiments or examples are not to be considered in a limiting sense, because numerous variations are contemplated. Accordingly, the present disclosure includes all novel and non-obvious combinations of the various systems and methods disclosed herein, as well as any and all equivalents thereof.

The invention claimed is:

1. A method for an engine, comprising:
   indicating a crankcase ventilation system degradation based on a lower vacuum than expected downstream of a PCV breather tube.

2. The method of claim 1, wherein indicating a crankcase ventilation system degradation based on a lower vacuum than expected downstream of a PCV breather tube includes indicating a crankcase ventilation system degradation based on an absolute pressure sensor measurement relative to a gauge pressure sensor measurement.

3. The method of claim 2, wherein the absolute pressure sensor is a barometric pressure sensor and the gauge pressure sensor is a compressor inlet pressure sensor.

4. The method of claim 2, wherein the absolute pressure sensor is a barometric pressure sensor and the gauge pressure sensor is a pressure sensor disposed in a PCV breather tube.

5. The method of claim 2, wherein the absolute pressure sensor is a compressor inlet pressure sensor and the gauge pressure sensor is a barometric pressure sensor.

6. The method of claim 2, wherein the absolute pressure sensor is a pressure sensor disposed in a PCV breather tube and the gauge pressure sensor is a barometric pressure sensor.

7. The method of claim 2, wherein the absolute pressure sensor is a compressor inlet pressure sensor and the gauge pressure sensor is a pressure sensor disposed in a PCV breather tube.

8. The method of claim 2, wherein the absolute pressure sensor is a pressure sensor disposed in a PCV breather tube and the gauge pressure sensor is a compressor inlet pressure sensor.

9. The method of claim 2, wherein a crankcase ventilation system degradation is indicated when the absolute pressure sensor measurement is substantially equal to the gauge pressure sensor measurement.

10. The method of claim 2, wherein the absolute pressure sensor measurement and the gauge pressure sensor measurement are measured during a high intake air flow engine operating condition.

11. The method of claim 2, wherein indicating a crankcase ventilation system degradation includes indicating a breach in the crankcase ventilation system.

12. A method for an engine, comprising:
indicating a crankcase ventilation system degradation based on relative pressure sensor readings of only two of a barometric pressure sensor, compressor inlet pressure sensor, and a pressure sensor disposed in a PCV breather tube.

13. The method of claim 12, wherein a crankcase ventilation system degradation is indicated when sensor readings of only two of a barometric pressure sensor, compressor inlet pressure sensor, and a pressure sensor disposed in a PCV breather tube are substantially equal.

14. The method of claim 12, wherein a crankcase ventilation system degradation is not indicated when sensor readings of only two of a barometric pressure sensor, compressor inlet pressure sensor, and a pressure sensor disposed in a PCV breather tube are not substantially equal.

15. The method of claim 12, wherein the sensor readings of only two of a barometric pressure sensor, compressor inlet pressure sensor, and a pressure sensor disposed in a PCV breather tube are measured during a high intake air flow engine operating condition.

16. The method of claim 12, wherein indicating a crankcase ventilation system degradation includes indicating a breach in the crankcase ventilation system.

17. The method of claim 12, wherein the barometric pressure sensor is disposed in an intake of the engine upstream from a PCV breather tube coupling with the engine intake and the compressor inlet pressure sensor is disposed in the engine intake downstream of the PCV breather tube coupling with the engine intake.

18. A method for an engine with a positive crankcase ventilation system, comprising:
during a high air speed engine operating condition, indicating a crankcase ventilation system degradation based on a barometric pressure substantially equal to a compressor inlet pressure.

19. The method of claim 18, wherein the barometric pressure is measured via a sensor disposed in an intake of the engine upstream from a PCV breather tube coupling with the engine intake and the compressor inlet pressure is measured via a sensor disposed in the engine intake downstream of the PCV breather tube coupling with the engine intake.

20. The method of claim 18, wherein the barometric pressure is measured via a sensor disposed in an intake of the engine upstream from a PCV breather tube coupling with the engine intake and the compressor inlet pressure is measured via a sensor disposed in the engine intake at the PCV breather tube coupling with the engine intake.

* * * * *